United States Patent
Zinno

(10) Patent No.: US 10,285,386 B2
(45) Date of Patent: May 14, 2019

(54) AQUARIUM SCENIC BACKLIGHTING DEVICE

(71) Applicant: Gus Zinno, Bayville, NJ (US)

(72) Inventor: Gus Zinno, Bayville, NJ (US)

( * ) Notice: Subject to any disclaimer, the term of this patent is extended or adjusted under 35 U.S.C. 154(b) by 612 days.

(21) Appl. No.: 14/987,366

(22) Filed: Jan. 4, 2016

(65) Prior Publication Data

US 2017/0188552 A1 Jul. 6, 2017

(51) Int. Cl.
| | |
|---|---|
| *A01K 63/06* | (2006.01) |
| *F21V 3/06* | (2018.01) |
| *F21V 21/08* | (2006.01) |

(52) U.S. Cl.
CPC ............... *A01K 63/06* (2013.01); *F21V 3/062* (2018.02)

(58) Field of Classification Search
CPC ....... A01K 63/06; F21V 3/0623; F21V 3/062; F21V 3/0436; F21V 7/05; F21V 21/096; F21V 21/08; F21V 23/04; F21V 23/06
See application file for complete search history.

(56) References Cited

U.S. PATENT DOCUMENTS

| | | | |
|---|---|---|---|
| 4,469,726 A | 9/1984 | Niinivuo | |
| 5,649,757 A | 7/1997 | Aleman et al. | |
| 6,742,477 B1 * | 6/2004 | Marraudino | A01K 63/006 119/256 |
| D551,398 S | 9/2007 | Hartje | |
| 7,726,829 B2 * | 6/2010 | Stuhr | A01K 63/006 362/101 |
| 2009/0147502 A1 * | 6/2009 | Aleman | A01K 63/006 362/101 |
| 2011/0048332 A1 * | 3/2011 | Lee | A01K 63/06 119/253 |

* cited by examiner

*Primary Examiner* — Anh T Mai
*Assistant Examiner* — Nathaniel J Lee

(57) ABSTRACT

An aquarium scenic backlighting device for aquariums includes a housing that has a front, a back, a bottom, a top, and opposing sides defining an internal space. The front is substantially transparent. A partition, which is complementary to the front and light defusing, is positioned in the internal space and coupled to the housing. The partition is positioned in parallel proximate to the front defining a slot. An opening to access the slot is positioned in the top. A power module and a bulb are positioned in the internal space and coupled to the housing. The bulb, which is operationally coupled to the power module, is positioned to illuminate a panel positioned in the slot. Each of a pair of brackets is coupled to the top proximate to a respective opposing side. The brackets are configured to reversibly couple the housing to a rear of an aquarium.

18 Claims, 5 Drawing Sheets

AQUARIUM SCENIC BACKLIGHTING DEVICE

BACKGROUND OF THE DISCLOSURE

Field of the Disclosure

The disclosure relates to backlighting devices and more particularly pertains to a new backlighting device for aquariums.

SUMMARY OF THE DISCLOSURE

An embodiment of the disclosure meets the needs presented above by generally comprising a housing that has a front, a back, a bottom, a top, and opposing sides defining an internal space. The front is substantially transparent. A partition, which is complementary to the front and light defusing, is positioned in the internal space and coupled to the housing. The partition is positioned in parallel proximate to the front defining a slot. An opening to access the slot is positioned in the top. A power module and a bulb are positioned in the internal space and coupled to the housing. The bulb, which is operationally coupled to the power module, is positioned to illuminate a panel positioned in the slot. Each of a pair of brackets is coupled to the top proximate to a respective opposing side. The brackets are configured to reversibly couple the housing to a rear of an aquarium.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
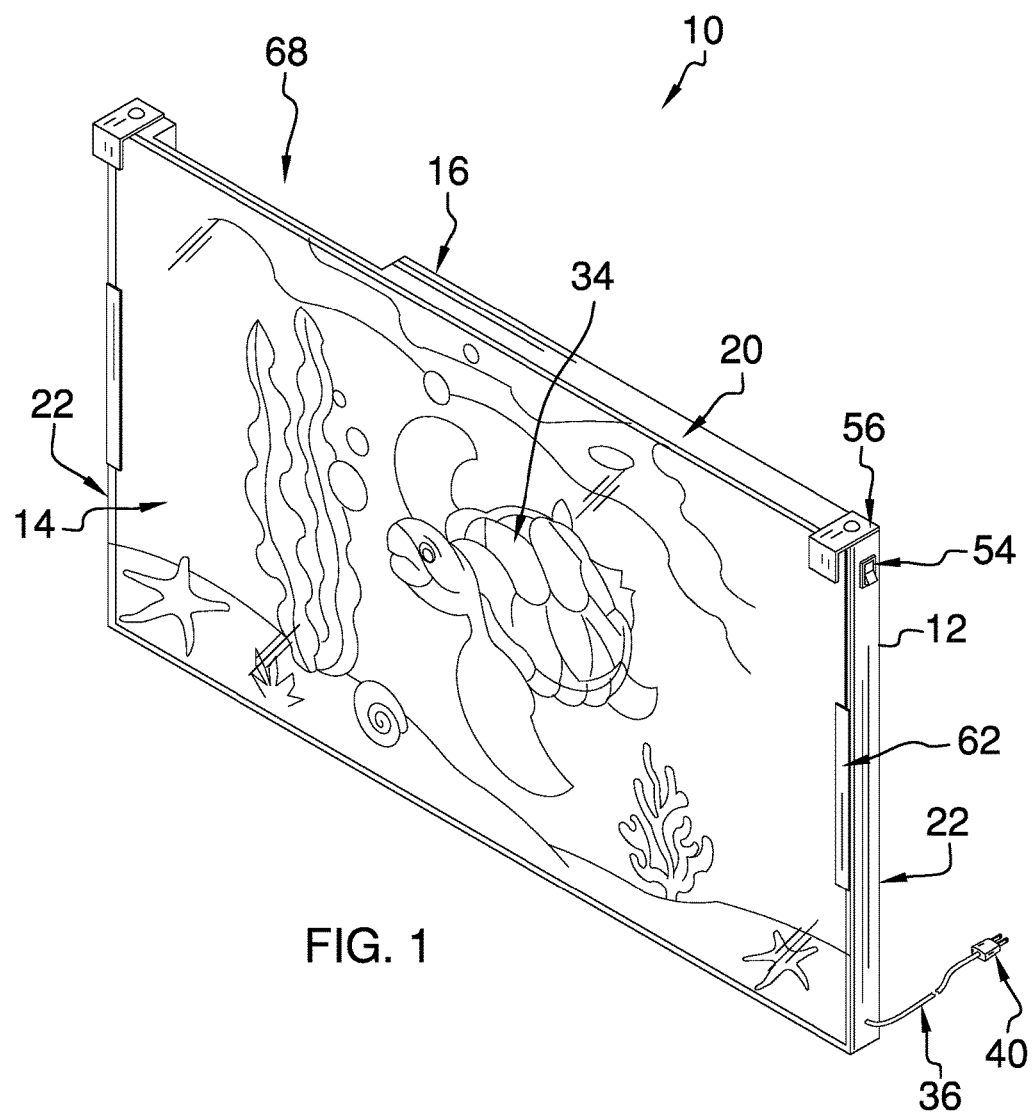
FIG. 1 is an isometric perspective view of an aquarium scenic backlighting device according to an embodiment of the disclosure.
Figure 2:
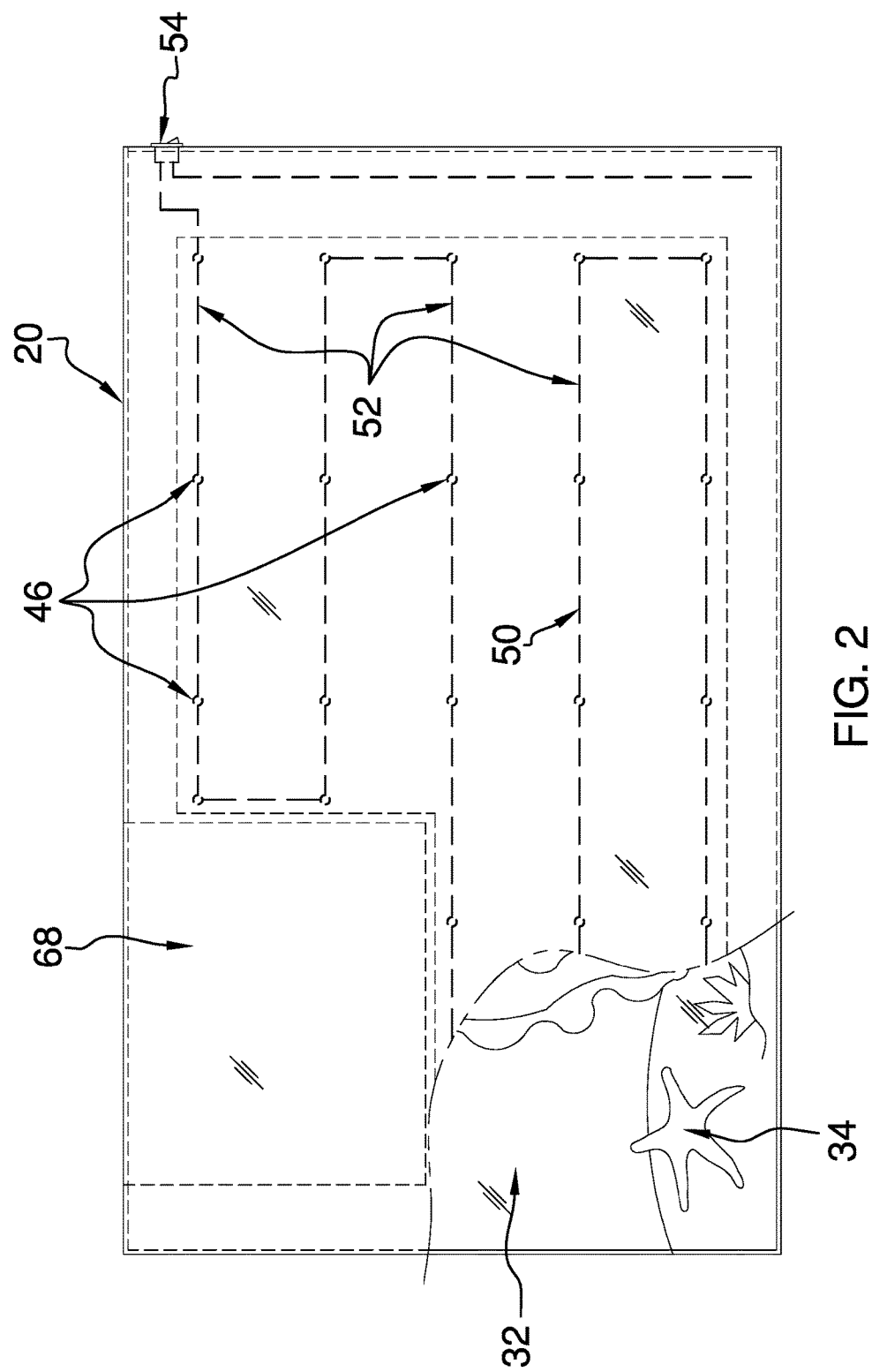
FIG. 2 is a front cut-away view of an embodiment of the disclosure.
Figure 3:
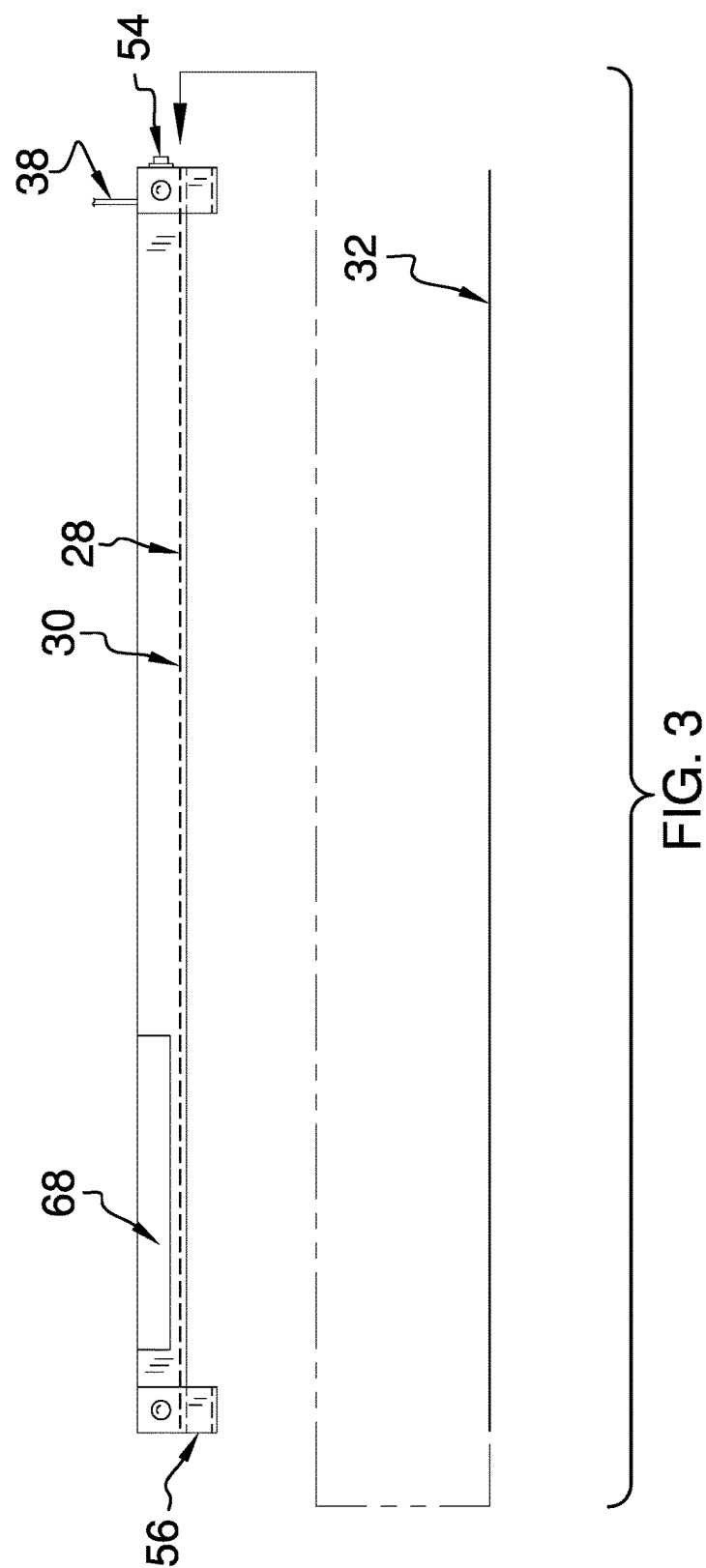
FIG. 3 is a top view of an embodiment of the disclosure.
Figure 4:
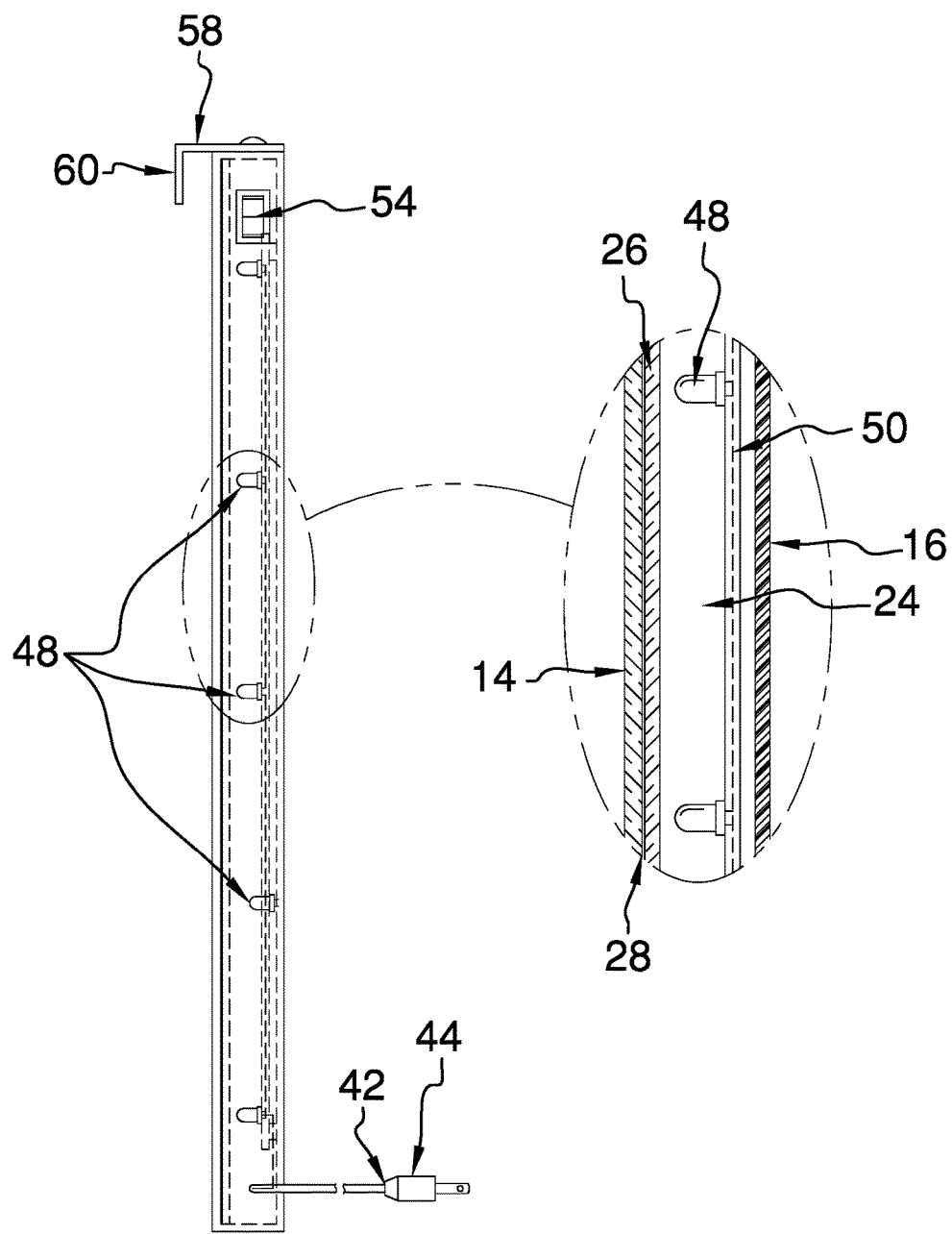
FIG. 4 is a side view of an embodiment of the disclosure.
Figure 5:
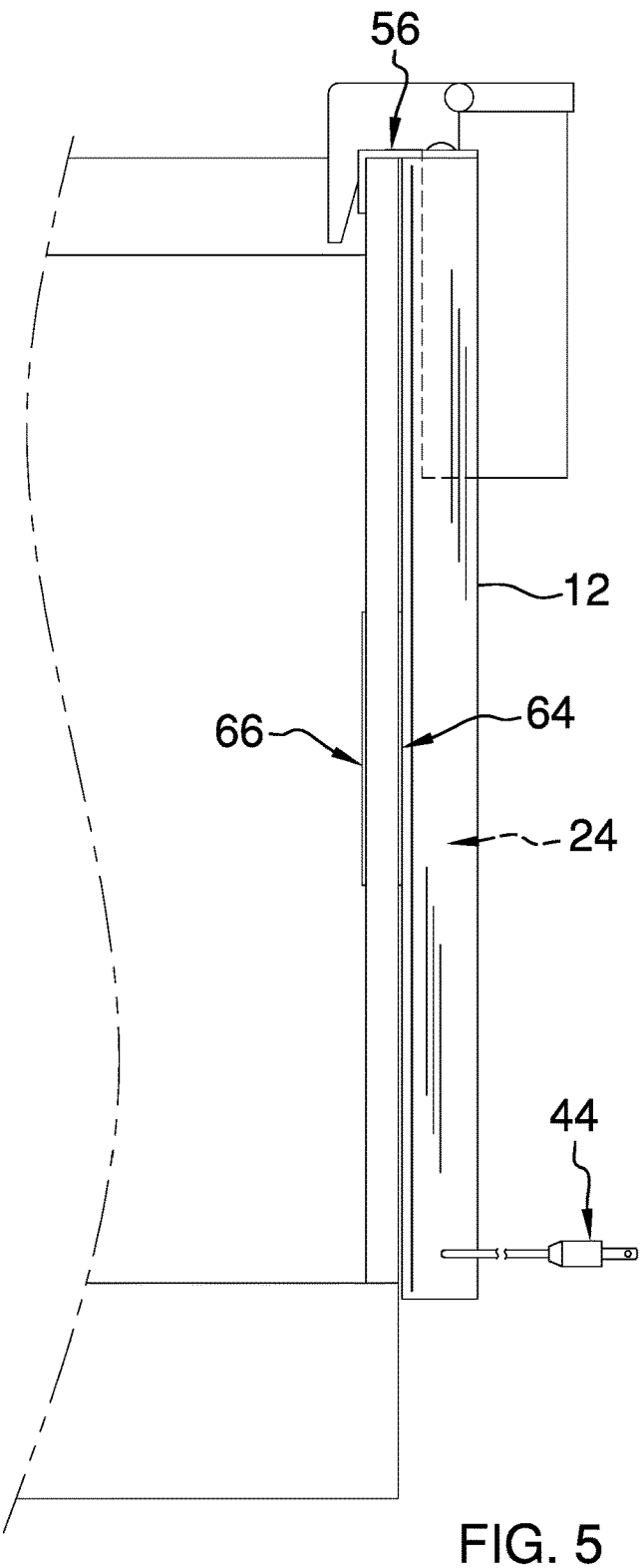
FIG. 5 is an in-use view of an embodiment of the disclosure.

With reference now to the drawings, and in particular to FIGS. 1 through 5 thereof, a new backlighting device embodying the principles and concepts of an embodiment of the disclosure and generally designated by the reference numeral 10 will be described.

As best illustrated in FIGS. 1 through 5, the aquarium scenic backlighting device 10 generally comprises a housing 12 that has a front 14, a back 16, a bottom 18, a top 20, and opposing sides 22 defining an internal space 24. The front 14 is substantially transparent and the back 16 is preferably mirrored. A partition 26, which is complementary to the front 14, is positioned in the internal space 24 and coupled to the housing 12. The partition 26 is positioned in parallel proximate to the front 14, defining a slot 28. The partition 26 is light defusing. An opening 30 is positioned is the top 20. The opening 30 is complementary to the slot 28, such that the slot 28 is accessible through the opening 30.

Each of a plurality of interchangeable panels 32 is complimentary to the slot 28 and depicts an image 34. Preferably, the image 34 is three-dimensional. The panels 32 comprise plastic.

A power module 36 is positioned in the internal space 24 and coupled to the housing 12. Preferably, the power module 36 comprises a power cord 38 that extends from a respective opposing side 22 of the housing 12 proximate to the bottom 18 of the housing 12. A coupler 40 is electrically coupled to a first end 42 of the power cord 38. The coupler 40 is configured to couple the power cord 38 to an alternating current power source. The coupler 40 is selected from the group of plug types consisting of plug Types A, B, C, D, E, F, G, H, I, J, K, L, M, N, and O. Preferably, the coupler 40 comprises a Type A plug 44.

A bulb 46 is positioned in the internal space 24 and coupled to the housing 12. The bulb 46 is operationally coupled to the power module 36. The bulb 46 is positioned to illuminate a respective panel 32 positioned in the slot 28. Light emitted by the bulb 46 is reflected from the back 16 to the front 14. Preferably, the bulb 46 comprises a plurality of light emitting diodes 48. Each light emitting diode 48 is coupled to a wire 50 positioned in the housing 12. The wire 50 is positioned in a looping pattern 52 adjacent to the back 16 of the housing 12.

A switch 54 is electrically coupled to the bulb 46 and the power module 36. The switch 54 is positioned to allow a user to selectively illuminate the panel 32. The switch 54 is positioned in a respective opposing side 22 of the housing 12 proximate to the top 20 of the housing 12.

Each of a pair of brackets 56 is coupled to the top 20 proximate to a respective opposing side 22. The brackets 56 are configured to reversibly couple the housing 12 to a rear of an aquarium. More specifically, each bracket 56 comprises a horizontal 58 and a vertical 60. The horizontal 58 is coupled to the top 20 and extends transversely from the front 14. The vertical 60 is coupled perpendicularly to the horizontal 58 distal from the front 14. The vertical 60 extends toward the bottom 18 of the housing 12. The horizontal 58 is configured to extend across an upper edge of a rear wall of the aquarium and the vertical 60 is configured to engage the rear wall of the aquarium to reversibly couple the housing 12 to the rear of the aquarium.

Each of a pair of fasteners 62 may be coupled to the front 14 of the housing 12 proximate to a respective opposing edge 22. The fasteners 62 are configured to couple the housing 12 to the rear wall of the aquarium. Preferably, the fasteners 62 are positioned on the front 14 substantially equally distant from the top 20 and the bottom 18. More specifically, each fastener 62 comprises a first magnet 64 and a second magnet 66. The first magnet 64 and the second magnet 66 are match-poled, such that the first magnet 64 and the second magnet 66 are mutually attractive. The first magnets 64 are coupled to the front 14 and the second magnets 66 are coupled to the rear wall of the aquarium. The first magnets 64 are positioned on the front 14 such that the first magnets 64 are couplable to the second magnets 66. Preferably, the second magnets 66 are coupled to the inside face of the rear wall of the aquarium.

An indentation 68 is positioned in the back 16 of the housing 12. The indentation 68 is configured to accommodate a filter to the aquarium. Preferably, the indentation 68 extends from the top 20 toward the bottom 18 and is positioned proximate to a respective the opposing side 22. The indentation 68 is substantially rectangular.

In use, the brackets 56 are configured to couple the housing 12 to the rear of the aquarium. The opening 30 is configured for the user to insert a respective panel 32 that comprises the image 34 selected by the user into the slot 28. The light emitting diodes 48 are positioned to illuminate the panel 32, such that the image 34 is visible through the aquarium.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An aquarium scenic backlighting device comprising:
   a housing, said housing having a front, a back, a bottom, a top, and opposing sides defining an internal space, said front being substantially transparent;
   a partition, said partition being complementary to said front, said partition being positioned in said internal space and coupled to said housing, said partition being positioned in parallel proximate to said front defining a slot, said partition being light defusing;
   an opening, said opening being positioned in said top, said opening being complementary to said slot, wherein said slot is accessible through said opening;
   a power module, said power module being positioned in said internal space and coupled to said housing;
   a bulb, said bulb being positioned in said internal space and coupled to said housing, said bulb being operationally coupled to said power module, wherein said bulb is positioned to illuminate a panel positioned in said slot;
   a pair of brackets, each bracket being coupled to said top proximate to a respective opposing side, said brackets being configured to reversibly couple said housing to a rear of an aquarium; and
   a pair of fasteners, each said fastener being coupled to said front of said housing proximate to a respective said opposing edge, said fasteners being configured to couple said housing to the rear wall of the aquarium, said fasteners being positioned on said front substantially equally distant from said top and said bottom.

2. The device of claim 1, further including said back being mirrored, wherein light emitted by said bulb is reflected from said back toward said front.

3. The device of claim 1, further including a plurality of interchangeable panels, said panels being complimentary to said slot, each said panel depicting an image.

4. The device of claim 3, further including said image being three-dimensional.

5. The device of claim 3, further including said panels comprising plastic.

6. The device of claim 1, further including said power module comprising a power cord, said power cord extending from a respective opposing side of said housing proximate to said bottom of said housing.

7. The device of claim 6, further including a coupler, said coupler being electrically coupled to a first end of said power cord, said coupler being selected from the group of plug types consisting of plug Types A, B, C, D, E, F, G, H, I, J, K, L, M, N, and O, wherein said coupler is configured for coupling said power cord to an alternating current power source.

8. The device of claim 7, further including said coupler comprising a Type A plug.

9. The device of claim 1, further including said bulb comprising a plurality of light emitting diodes, each said light emitting diode being coupled to a wire positioned in said housing.

10. The device of claim 9, further including said wire being positioned in a looping pattern adjacent to said back of said housing.

11. The device of claim 1, further including a switch, said switch being electrically coupled to said bulb and said power module, wherein said switch is positioned to allow a user to selectively illuminate said panel.

12. The device of claim 11, further including said switch being positioned in a respective opposing side of said housing proximate to said top of said housing.

13. The device of claim 1, further including each said bracket comprising:
   a horizontal, said horizontal being coupled to said top and extending transversely from said front;
   a vertical, said vertical being coupled perpendicularly to said horizontal distal from said front, said vertical extending toward said bottom of said housing; and
   wherein said horizontal is configured to extend across an upper edge of a rear wall of the aquarium and said vertical is configured to engage the rear wall of the aquarium to reversibly couple said housing to the rear of the aquarium.

14. The device of claim 1, further including an indentation, said indentation being positioned in said back of said housing, said indentation being configured to accommodate a filter for the aquarium.

15. The device of claim 14, further including said indentation extending from said top toward said bottom, said indentation being positioned proximate to a respective said opposing side, said indentation being substantially rectangular.

16. An aquarium scenic backlighting device comprising:
   a housing, said housing having a front, a back, a bottom, a top, and opposing sides defining an internal space, said front being substantially transparent;
   a partition, said partition being complementary to said front, said partition being positioned in said internal space and coupled to said housing, said partition being positioned in parallel proximate to said front defining a slot, said partition being light defusing;

an opening, said opening being positioned in said top, said opening being complementary to said slot, wherein said slot is accessible through said opening;

a power module, said power module being positioned in said internal space and coupled to said housing;

a bulb, said bulb being positioned in said internal space and coupled to said housing, said bulb being operationally coupled to said power module, wherein said bulb is positioned to illuminate a panel positioned in said slot;

a pair of brackets, each bracket being coupled to said top proximate to a respective opposing side, said brackets being configured to reversibly couple said housing to a rear of an aquarium; and a pair of fasteners, each said fastener being coupled to said front of said housing proximate to a respective said opposing edge, said fasteners being configured to couple said housing to the rear wall of the aquarium, each said fastener comprising a first magnet and a second magnet, said first magnet and said second magnet being match-poled, such that said first magnet and said second magnet are mutually attractive, said first magnets being coupled to said front, said second magnets being coupled to the rear wall of the aquarium, wherein said first magnets are positioned on said front such that said first magnets are couplable to said second magnets.

17. The device of claim 16, further including said second magnets being coupled to the inside face of the rear wall of the aquarium.

18. An aquarium scenic backlighting device comprising:

a housing, said housing having a front, a back, a bottom, a top, and opposing sides defining an internal space, said front being substantially transparent, said back being mirrored;

a partition, said partition being complementary to said front, said partition being positioned in said internal space and coupled to said housing, said partition being positioned in parallel proximate to said front defining a slot, said partition being light defusing;

an opening, said opening being positioned in said top, said opening being complementary to said slot, wherein said slot is accessible through said opening;

a plurality of interchangeable panels, said panels being complimentary to said slot, each said panel depicting an image, said image being three-dimensional, said panels comprising plastic;

a power module, said power module being positioned in said internal space and coupled to said housing, said power module comprising a power cord, said power cord extending from a respective opposing side of said housing proximate to said bottom of said housing;

a coupler, said coupler being electrically coupled to a first end of said power cord, said coupler being selected from the group of plug types consisting of plug Types A, B, C, D, E, F, G, H, I, J, K, L, M, N, and O, wherein said coupler is configured for coupling said power cord to an alternating current power source, said coupler comprising a Type A plug;

a bulb, said bulb being positioned in said internal space and coupled to said housing, said bulb being operationally coupled to said power module, wherein said bulb is positioned to illuminate a respective said panel positioned in said slot and wherein light emitted by said bulb is reflected from said back to said panel, said bulb comprising a plurality of light emitting diodes, each said light emitting diode being coupled to a wire positioned in said housing, said wire being positioned in a looping pattern adjacent to said back of said housing;

a switch, said switch being electrically coupled to said bulb and said power module, wherein said switch is positioned to allow a user to selectively illuminate said panel, said switch being positioned in a respective opposing side of said housing proximate to said top of said housing;

a pair of brackets, each bracket being coupled to said top proximate to a respective opposing side, said brackets being configured to reversibly couple said housing to a rear of an aquarium;

each said bracket comprising a horizontal and a vertical, said horizontal being coupled to said top and extending transversely from said front, said vertical being coupled perpendicularly to said horizontal distal from said front, said vertical extending toward said bottom of said housing, wherein said horizontal is configured to extend across an upper edge of a rear wall of the aquarium and said vertical is configured to engage the rear wall of the aquarium to reversibly couple said housing to the rear of the aquarium;

a pair of fasteners, each said fastener being coupled to said front of said housing proximate to a respective said opposing edge, said fasteners being configured to couple said housing to the rear wall of the aquarium, said fasteners being positioned on said front substantially equally distant from said top and said bottom;

each said fastener comprising a first magnet and a second magnet, said first magnet and said second magnet being match-poled, such that said first magnet and said second magnet are mutually attractive, said first magnets being coupled to said front, said second magnets being coupled to the rear wall of the aquarium, wherein said first magnets are positioned on said front such that said first magnets are couplable to said second magnets, said second magnets being coupled to the inside face of the rear wall of the aquarium an indentation, said indentation being positioned in said back of said housing, said indentation being configured to accommodate a filter for the aquarium, said indentation extending from said top toward said bottom, said indentation being positioned proximate to a respective said opposing side, said indentation being substantially rectangular; and wherein said brackets are configured to couple said housing to the rear of the aquarium, wherein said light emitting diodes are positioned to illuminate said panel positioned in said slot, such that said image is visible through the aquarium.

* * * * *